United States Patent [19]
Holub

[11] 3,735,270
[45] May 22, 1973

[54] DELAYED PULSE GENERATOR

[75] Inventor: George J. Holub, Dix Hills, N.Y.

[73] Assignee: The United States of America as represented by the Secretary of the Navy, Washington, D.C.

[22] Filed: Mar. 20, 1972

[21] Appl. No.: 236,016

[52] U.S. Cl. .....................328/55, 307/265, 307/268, 307/293, 328/58
[51] Int. Cl. ..............................................H03k 5/153
[58] Field of Search.......................307/265, 268, 269, 307/273, 293; 328/55, 58

[56] References Cited

UNITED STATES PATENTS 3,461,321 8/1969 Greene ................................307/273
3,629,710 12/1971 Durland ................................328/58

*Primary Examiner*—John Zazworsky
*Attorney*—R. S. Sciascia, Henry Hansen and Arthur A. McGill

[57] ABSTRACT

A delayed pulse signal of a predetermined pulse width is obtained by having a free running clocking pulse generator provide a series of pulses to a first shift register. The first shift register provides a time delay for a predetermined number of pulses before supplying the delayed pulse signal and an enabling signal to a second shift register. The second shift register provides a time delay for a predetermined number of pulses and then supplies an output signal that inhibits the clock and at the same time inhibits the delayed pulse by resetting the first shift register.

8 Claims, 2 Drawing Figures

DELAYED PULSE GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to pulse generators and more particularly to a delayed one-shot predetermined pulse width generator.

In present day integrated circuitry, multiple micro components are sold on the same chip. In order to economize it is preferable to use several identical components in the same system that are on the same chip instead of different types of components to perform a specified function. In this way purchased items are utilized to their greatest capacity and a minimum number of components are purchased. This results not only in savings of money but in space resulting in further miniaturization of the system.

Until recently system designers generally did not concern themselves with using a multiple of the same type components since chips with multiple components were not available and discrete components were used. The result is that prior art pulse width generators used a large number of discrete components since efficiency standards differed and no components were left unused.

Additionally, prior art devices for providing a delay to predetermined pulse width signals normally did not concern themselves with the clocking device so that after providing the required delayed pulse width signals the clock kept in operation and was controlled by a device external to the pulse width system resulting in added components and less efficiency.

SUMMARY OF THE INVENTION

It is therefore an object of the present invention to provide an improved delayed one-shot pulse generator. It is a further object to provide such a device utilizing only miniaturized integrated circuits. Another object is to provide economy by using a multiple number of each component in preference to a plurality of differing components. An additional object is to provide a delayed one-shot system that includes and controls its own clocking device.

This is accomplished according to the present invention with a system using available components that can all be TTL integrated circuits. A plurality of clock pulses are generated within the system and an output pulse of predetermined pulse width is provided after a first predetermined number of clock pulses. After a second predetermined number of clock pulses the output pulse signal and the clock pulses are inhibited.

DESCRIPTION OF THE PREFERRED EMBODIMENT

Figure 1:
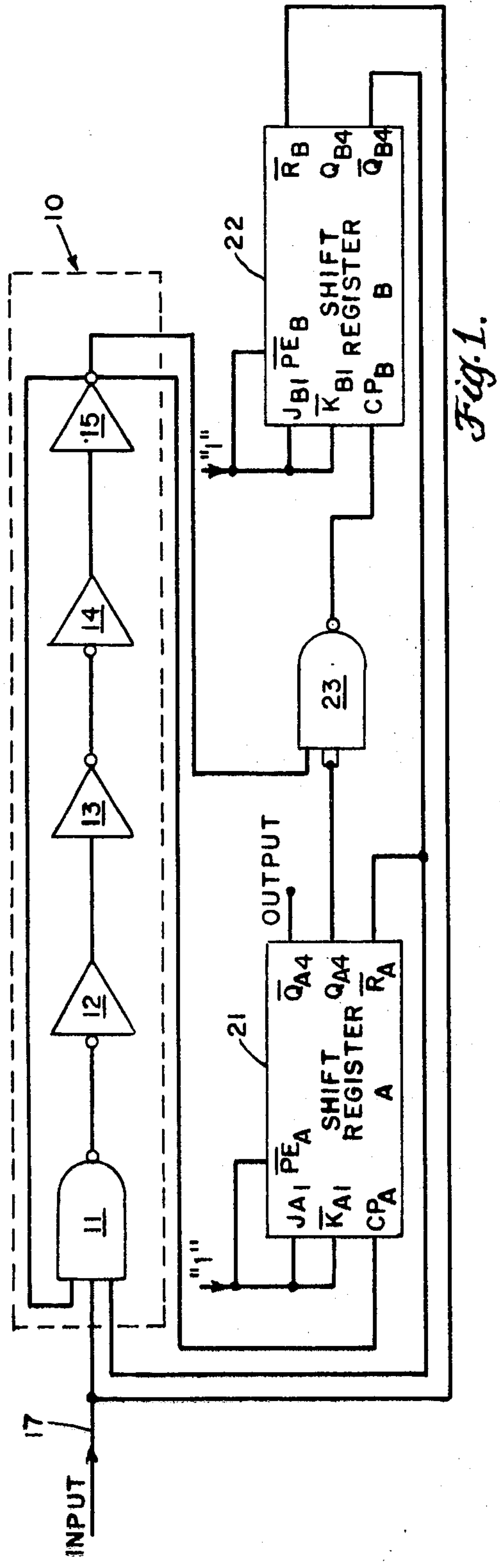
FIG. 1 is a schematic and block diagram of an embodiment of the present invention.

Referring now to FIG. 1 there is shown a free running clock 10 comprised of a series connected combination of a NAND gate, and inverter amplifiers 12, 13, 14 and 15. The inverter amplifiers 12, 13, 14 and 15 upon receipt of a particular logic level signal supply an output of opposite level. The output of inverter 15 is returned as one of a plurality of inputs to NAND gate 11. Prior to the receipt of a "1" level signal on a line 17 which may be supplied by a power supply such as a battery (not shown), the NAND gate 11 provides a "1" level output. This would cause the inverter 12 to provide a "0" level pulse, the inverter 13 to provide a "1" level pulse, the inverter 14 to provide a "0" level pulse, and inverter 15 to provide a "1" level pulse. At this time a second "1" level signal is being received by NAND gate 11 from a $Q_{B4}$ output terminal, to be explained later. Upon receipt of a "1" level input on line 17 all "1" level inputs are present at NAND gate 11 and it can be seen that the output of inverter 15 would become "0" level which, in turn, would cause a shift in level of the outputs of components 11, 12, 13, 14 and 15 so that the output of inverter 15 would continuously pulse from a "1" level to a "0" level providing a free running clock.

A standard four bit shift register 21 using J-K flip-flops is shown as shift register A and is capable of shifting input signals to the right upon receipt of a clocking pulse. The subscript letters on terminals of the shift registers of FIG. 1 are for ease in referring to a particular shift register. For example all terminals of shift register 21 have a subscript A. In addition, following the subscript letters the terminals have subscript numerals referring to the particular stage or bit within the shift register, where applicable. For instance, subscript 1 refers to the first stage and subscript 4 the fourth stage.

Shift register 21 is connected to receive the output of inverter amplifier 15 at its clocking pulse $CP_A$ input. A logic "1" level signal is applied to the first stage $J_{A1}$ input, the first stage $\overline{K}_{A1}$ input and the inverted pulse enable input $\overline{PE}_A$. The shift register 21 has outputs $Q_{A4}$ and $\overline{Q}_{A4}$ indicating the output from the fourth stage. The shift register 21 also has an inverted reset terminal $\overline{R}_A$ for use in clearing the register 21 for operation. A delayed pulse output signal is provided by terminal $\overline{Q}_{A4}$. A NAND gate 23 identical to NAND gate 11 is connected to receive the output signal of inverter amplifier 15 and a second signal from the $Q_{A4}$ terminal of shift register 21. Since the NAND gate 23 being identical to NAND gate 11 has three input terminals any two can be tied together and connected to one of the received signals. The output of NAND gate 23 is connected through a second shift register 22 identified as shift register B. The structure of shift register 22 can be identical to shift register 21. The shift register 22 receives the output of NAND gate 23 at its clock pulse terminal $CP_B$. A "1" signal is provided to inverted pulse enable input $\overline{PE}_B$ and to the $J_{B1}$ and $\overline{K}_{B1}$ terminals. The shift register 22 has an inverted reset terminal $\overline{R}_B$ and output terminals for the fourth stage $Q_{B4}$ and $\overline{Q}_{B4}$. The $\overline{R}_B$ terminal is connected to input line 17 and the $\overline{Q}_{B4}$ terminal is connected to the $\overline{R}_A$ terminal of shift register 21 and an input terminal of NAND gate 11.

Figure 2:
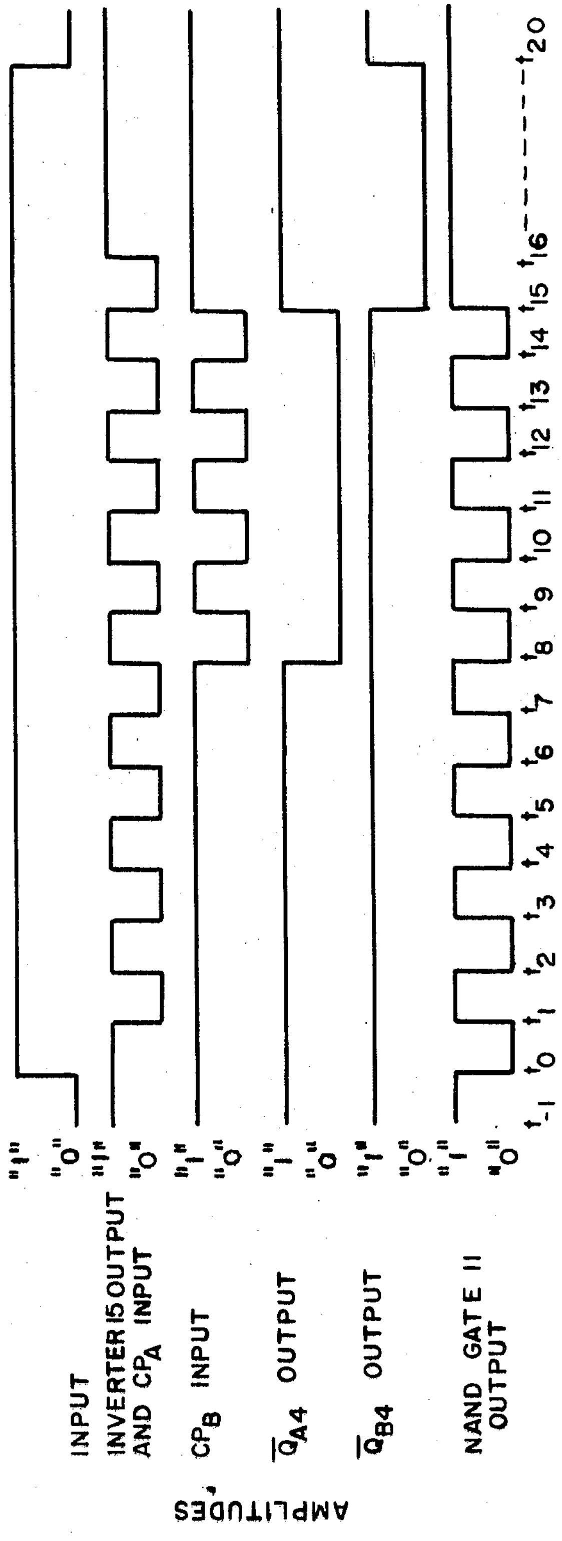
FIG. 2 represents waveforms at specified intervals at locations within the system of FIG. 1.

The operation of the device can be more clearly understood with reference to both FIGS. 1 and 2. At time $t_{-1}$ prior to the receipt of an input signal on line 17 the levels present at various points in the system can be seen in FIG. 2. The $CP_A$ input for shift register 21 can be seen to be a "1" level for reasons previously explained with regard to free running clock 10. The $\overline{Q}_{A4}$ has a "1" level output from being reset at the end of the previous cycle. This causes $Q_{A4}$ to have a "0" output level applied to NAND gate 23 which gives $CP_B$ input a "1" level signal. The shift register 22 has a "1" level output at its $\overline{Q}_{B4}$ terminal due to a "0" level signal being received at inverted reset terminal $\overline{R}$ from line 17 that resets shift register 22. A "1" output level at the $\overline{Q}_{B4}$ terminal of shift register 22 has no effect upon the output terminals of shift register 21 but provides a "1" level signal to one of the terminals of NAND gate 11 so that it may be pulsed upon receipt of a "1" level input signal on line 17. Upon receipt of an input signal on line 17 it will be assumed that NAND gate 11 operates instantaneously for purposes of simplification, and the delays within the clock 10 are caused solely by inverters 12, 13, 14 and 15.

NAND gate 11 at time $t_0$ receives a "1" level signal on line 17 making all inputs "1" level. This causes the NAND gate output to go to a "0" level. After a time delay caused by the inherent structure of the inverters the inverter output 15 goes negative. This is shown at $t_1$. The negative pulse at the output of inverter 15 causes NAND gate 11 to go positive. This positive pulse from NAND gate 11 after a predetermined period of time causes the output of inverter 15 to go positive again. This is shown at time $t_2$ and pulses NAND gate 11 negative again. These output pulses from inverter 15 and NAND gate 11 continue with the inverter 15 output lagging the NAND gate 11 output by the time interval for operating the intermediate inverters 12, 13, 14 and 15. Register 21 responds to the positive going pulses from the inverter 15 output and upon receipt of the fourth positive going pulse from inverter 15 which occurs at $t_8$ the register 21 $\overline{Q}_{A4}$ output goes negative. Simultaneously a positive going pulse from the $Q_{A4}$ output enables NAND gate 23 to provide a negative going signal to input $CP_B$ of shift register 22. As can be seen from FIG. 2 the $CP_B$ input to register 22 is receiving an inverted signal to that received at the register 21 $CP_A$ input. At the fourth positive going pulse received at the $CP_B$ input the output of shift register 22 has its $\overline{Q}_{B4}$ output shift from "1" level to "0" level. This occurs at $t_{15}$. This output from the $\overline{Q}_{B4}$ terminal of shift register 22 causes NAND gate 11 to switch to a "1" level output and inhibits further operation of the gate 11. At time $t_{16}$ this pulse from NAND gate 11 is traversed down through inverter 15 and the output of inverter 15 goes to a "1" level and inverter 15 is inhibited from further operation. The output $\overline{Q}_{B4}$ at shift register 22 is also applied to reset $\overline{R}_A$ of shift register 22 at time $t_{15}$ causing output $Q_{A4}$ to go to the "0" level and $\overline{Q}_{A4}$ to go to the "1" level ending the delayed pulse output signal. The device has now generated its delayed pulse output at its $\overline{Q}_{A4}$ terminal from $t_8$ to $t_{15}$ and has been inhibited from further operation.

At a time later indicated as $t_{20}$ the input "1" level signal is removed from line 17. This resets shift register 22 causing the $\overline{Q}_{B4}$ output terminal to go to a "1" level. This "1" level from the $\overline{Q}_{B4}$ output terminal is received at the $\overline{R}_A$ terminal but causes no change in the $Q_{A4}$ and $\overline{Q}_{A4}$ outputs of register 21 but clears the register 21 for operation by a clocking pulse. As can be seen at time $t_{20}$ all levels are the same as at time $t_{-1}$ so that if a "1" level input signal is received the device would start a new cycle.

The length of the delayed pulse generated can be varied within the intended scope of the invention by either changing the number of stages used in the shift registers or changing the number of inverters. All stages within the shift register need not be utilized and the outputs may be taken off an intermediate stage. Obviously in any shift register wherein the selected output stage is lacking an inverted output terminal an inverter amplifier may be added to supply the necessary signals.

There has therefore been described a device for providing a delayed one-shot output signal of a predetermined pulse width which may be made from integrated circuits having TTL logic and wherein both registers required may be the same type, both NAND gates the same type, and all four inverters the same type. Furthermore, all components in the device are inhibited upon completion of the delayed pulse ending a cycle of operation.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A delayed pulse width generator comprising:
   - a free running clock providing a first plurality of pulses;
   - pulse generating means connected to receive said first plurality of pulses for providing a delayed pulse of a predetermined pulse width;
   - timing means connected to receive said delayed pulse and said first plurality of pulses for providing an inhibiting signal to said free running clock and said pulse generating means upon the coincidence of said delayed pulse and a predetermined number of said plurality of pulses.

2. A delayed pulse width generator according to claim 1 wherein said
   - free running clock further comprises:
   - a first NAND gate; and
   - a plurality of inverter amplifiers serially connected to said first NAND gate and to each other.

3. A delayed pulse width generator according to claim 2 wherein said plurality of inverter amplifiers are identical to each other.

4. A delayed pulse width generator according to claim 3 wherein said pulse generating means further comprises a first four bit shift register.

5. A delayed pulse width generator according to claim 4 wherein said first four bit shift register further comprises a plurality of J–K flip flops.

6. A delayed pulse width generator according to claim 5 wherein said timing means further comprises:
   - gating means connected to receive said first plurality of pulses and said delayed pulse for providing a second plurality of pulses of opposite polarity to said first plurality of pulses upon the coincidence of said delayed pulse and said first plurality of pulses; and
   - a second four bit shift register connected to said gating means, said free running clock and said pulse generating means for providing an inhibiting signal to said free running clock and said pulse generating means upon receipt of a predetermined number of said second plurality of pulses.

7. A delayed pulse width generator according to claim 6 wherein said gating means further comprises a second NAND gate identical to said first NAND gate.

8. A delayed pulse width generator according to claim 7 wherein said second four bit shift register is identical to said first four bit shift register.

* * * * *